Aug. 23, 1927.

J. F. O'CONNOR 1,640,207

ANTIFRICTION BEARING

Filed July 9, 1923

Witnesses

Wm. Geiger

Inventor
John F. O'Connor
By George J. Haight
His Atty.

Patented Aug. 23, 1927.

1,640,207

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

ANTIFRICTION BEARING.

Application filed July 9, 1923. Serial No. 650,205.

This invention relates to improvements in antifriction bearings.

The object of the invention is to provide an antifriction bearing, especially adapted for railway side bearing use, which bearing comprises few parts each of simple design adapting it for relatively inexpensive manufacture, and wherein the parts are so arranged that the anti-friction element proper is automatically centered when free from load, under the influence of gravity.

Figure 1:
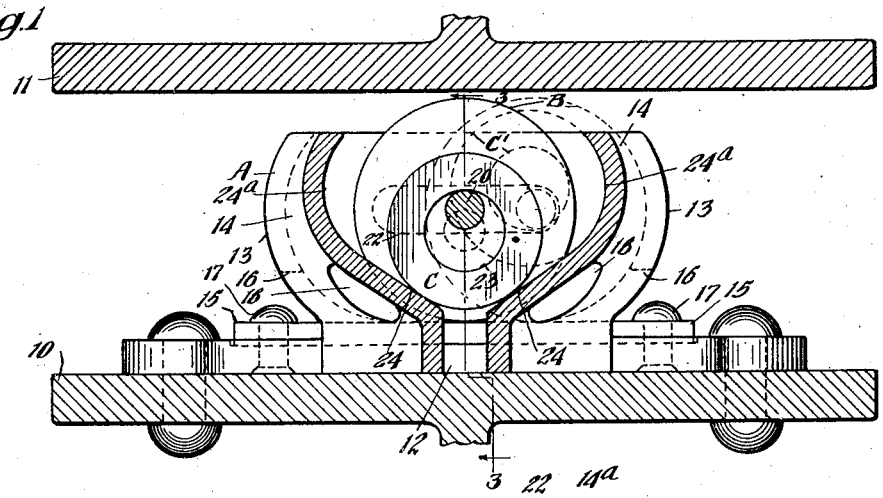
Figure 2:
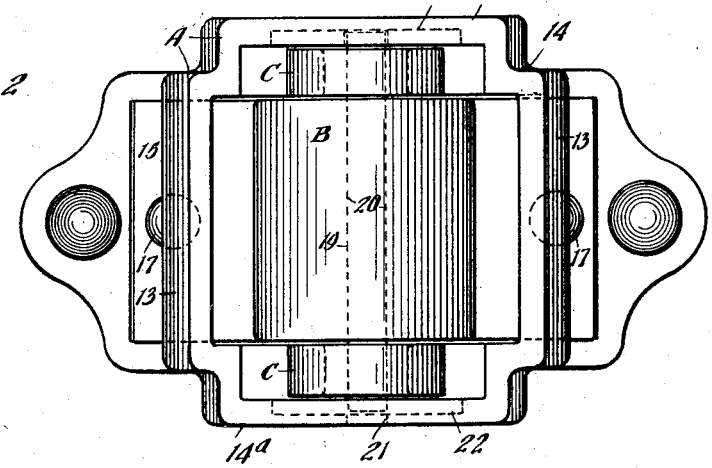
Figure 3:
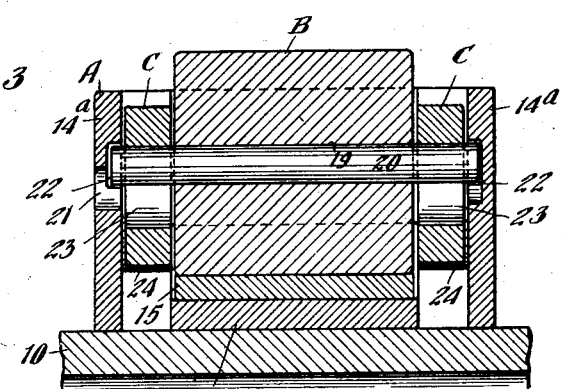

In the drawing forming a part of this specification, Figure 1 is a vertical sectional view taken through the ends of the body and truck bolsters of a car showing my improvements in connection therewith. Figure 2 is a top plan view of the side bearing proper shown in Figure 1. And Figure 3 is a vertical transverse sectional view corresponding to the section line 3—3 of Figure 1.

In said drawing, 10 denotes the upper portion of a truck bolster and 11 the under portion of a corresponding opposed body bolster. The improved bearing is shown applied to the truck bolster and comprises, broadly, a base casting, retaining member or housing A; an anti-friction element proper B; and a pair of counter weights C.

The housing A is of more or less box-like form having a bottom wall 12, curved end walls 13—13, and vertical side walls 14—14, each of the latter in turn having a laterally offset section 14ª for the purpose hereinafter described. Preferably a hardened wear plate 15 is inserted in the bottom of the housing, the latter being entered through suitable end openings 16 of the housing and secured in place by rivets or other suitable fastening devices 17. The side walls of the housing may be provided with ventilating openings 18, as shown in Figure 1.

The anti-friction element B, in the instance shown, is of true cylindrical form adapted to roll back and forth to either side of central normal position on the bottom bearing plate 15. Said roller is provided with an axially disposed opening 19 through which is extended a pin 20, the latter being entered through a suitable opening 21 in one of the side walls before the plate 15 is applied so that, when the plate 15 is in position, the pin 20 will be elevated above the opening 21 and hence the parts maintained in assembled relation. The extreme ends of the pin 20 travel back and forth within horizontally elongated recesses 22—22 provided in the offset sections 14ª of the housing side walls.

The counterweights C are of like construction and each is in the form of an annulus with a relatively large central opening 23 of preferably slightly more than twice the diameter of the pin 20. The disks or counterweights C are loosely hung upon the ends of the pin 20, as clearly shown in Figures 1 and 3. In the normal position of the parts, the arrangement will be such that the counterweights will just engage the top side of the pin 20 on the interior opening 23 and on their outer peripheries will be in contact with sloping walls 24—24, which define the ends of the offset sections 14ª of the housing side walls. Said sloping walls 24 are symmetrically arranged with respect to the center line of the bearing and diverge upwardly, each of said walls, at its upper end, terminating in an arcuate section 24ª of a radius corresponding to the greater radius of the annular counterweights C.

The operation of the device is as follows, assuming a movement of the anti-friction element toward the right, as viewed in Figure 1. As the element B rolls toward the right, the pin 20 is carried thereby and moves in a straight horizontal line. Due to the ends of the pin 20 having contact with the inner surfaces of the counterweights C, the latter will be shifted bodily lengthwise of the housing and at the same time will be rolled up the corresponding inclined walls 24 until the counterweights reach the dotted line position indicated at $C^1$ in Figure 1. The movement of the element B is limited by engagement with the end wall of the housing, and, at the limit of movement it will be noted the counterweights C are in a position of unstable equilibrium with the centers of weight thereof to the left of the center of the pin 20, as viewed in Figure 1. When the load is removed from the anti-friction element B, it is evident that the counterweights C will not only tend to roll down the inclined walls 24, but will exert an appreciable multiplied leverage action upon the pin 20 and force the latter positively toward the left and until the parts assume their normal position shown by the full lines in Figure 1. I wish to call attention particularly to the fact that the effective action on the pin 20 in returning the anti-friction element to central position is, initially, much greater than the mere dead weight of the counterweights C due to the leverage action above referred to. In this manner, the device is made much more sensitive, although, as the parts reach central position, the anti-friction element B will be prevented from passing beyond the center and thus will be prevented from vibrating to either side of center because of the counterweights being in their dependent position at that time.

I have herein shown and described what I now consider the preferred manner of carrying out my invention, but the same is merely illustrative and I contemplate all changes and modifications that come within the scope of the claims appended hereto.

I claim:

1. In a side bearing for railway cars, the combination with a housing adapted to be secured to a bolster, said housing having a bearing surface therein; of an anti-friction roller disposed within said housing and adapted to roll to either side of central position; a pin extending axially through said roller; and a pair of counterweight annuli suspended on the ends of said pin, each of said annuli having an enlarged central opening, the housing having walls symmetrically arranged with respect to the center of the bearing and inclined upwardly therefrom and co-operable with said annuli to elevate the latter as the roller is moved to either side of central position.

2. In a side bearing for railway cars, the combination with a housing having a lower bearing surface and adapted to be secured to a truck bolster; of a roller disposed within said housing and having an axially extending pin therethrough; and rings loosely mounted on the ends of said pin, said housing having upwardly diverging walls at each end of the roller co-operable with said rings to effect elevation thereof to a position of unstable equilibrium when the roller is moved to either side of central position.

3. In an anti-friction bearing, the combination with a housing adapted to be secured to a bolster or the like, said housing being provided with oppositely inclined surfaces symmetrically arranged with respect to the transverse center line of the housing and having also a bearing surface associated therewith; of an anti-friction element disposed within said housing for rolling movement on said bearing surface; a counterweight engageable and co-operable with said inclined surfaces, said counter-weight having a relatively large centrally disposed recess; and means carried by and extending axially of said element and within said recess, said means being engageable with the surface of said counter-weight defined by said recess, said means being of appreciably smaller sectional area than the area of said recess whereby, upon actuation of the anti-friction element to either side of normal position, said counter-weight is bodily elevated by one of said bearing surfaces and simultaneously shifted with respect to said means with a leverage increasing effect thereon, said counter-weight being returned under the influence of gravity and effecting return of the anti-friction element to normal position when said element is relieved of load.

In witness that I claim the foregoing I have hereunto subscribed my name this 6th day of July, 1923.

JOHN F. O'CONNOR.